United States Patent
Lee

(10) Patent No.: US 8,627,365 B2
(45) Date of Patent: Jan. 7, 2014

(54) MULTI-MOVING PICTURE SEARCHING SERVICE PROVIDING SYSTEM AND METHOD

(75) Inventor: Ji-Young Lee, Seoul (KR)

(73) Assignee: Alicast Corporation, Seoul (KR)

( * ) Notice: Subject to any disclaimer, the term of this patent is extended or adjusted under 35 U.S.C. 154(b) by 748 days.

(21) Appl. No.: 12/155,873

(22) Filed: Jun. 11, 2008

(65) Prior Publication Data

US 2008/0320532 A1   Dec. 25, 2008

(30) Foreign Application Priority Data

Jun. 12, 2007   (KR) ..................... 10-2007-0057354

(51) Int. Cl.
*G06F 3/00*   (2006.01)
*H04N 7/173*   (2011.01)

(52) U.S. Cl.
USPC .................... 725/41; 725/43; 725/91; 725/44; 725/47

(58) Field of Classification Search
USPC .......................................................... 725/91
See application file for complete search history.

(56) References Cited

U.S. PATENT DOCUMENTS

| | | | | |
|---|---|---|---|---|
| 7,020,381 | B1 * | 3/2006 | Kato et al. ................. | 386/280 |
| 2002/0067376 | A1 * | 6/2002 | Martin et al. ............... | 345/810 |
| 2003/0132971 | A1 * | 7/2003 | Billmaier et al. ............ | 345/810 |
| 2006/0161531 | A1 * | 7/2006 | Khandelwal et al. ........ | 707/3 |
| 2006/0282852 | A1 * | 12/2006 | Purpura et al. .............. | 725/39 |
| 2007/0011702 | A1 * | 1/2007 | Vaysman ..................... | 725/45 |
| 2011/0093494 | A1 * | 4/2011 | Chandler et al. ............ | 707/769 |

FOREIGN PATENT DOCUMENTS

| | | |
|---|---|---|
| EP | 0 755 604 B | 1/1997 |
| EP | 1 246 465 A2 | 10/2002 |
| KR | 10-1998-0004130 | 3/1998 |
| KR | 10-0194923 B1 | 6/1999 |
| KR | 10-2001-0028562 A | 4/2001 |
| KR | 10-2002-0005928 A | 1/2002 |
| KR | 100411174 B1 | 12/2003 |
| KR | 10-2004-0110871 A | 12/2004 |
| WO | WO 98/56176 A1 | 12/1998 |
| WO | 02/45304 A2 | 6/2002 |
| WO | WO 2005/107245 A1 | 11/2005 |

OTHER PUBLICATIONS

Summons to attend oral proceedings pursuant to Rule 115(1) EPC, Application No. 08 010 734, dated Feb. 18, 2011.

* cited by examiner

*Primary Examiner* — Brian Pendleton
*Assistant Examiner* — Jean D Saint Cyr
(74) *Attorney, Agent, or Firm* — Nath, Goldberg & Meyer; Jerald L. Meyer; Stanley N. Protigal

(57) ABSTRACT

Disclosed is a multi picture searching service providing system. The multi picture searching service providing system includes a head end transmitting a multi moving picture including plural moving pictures, moving picture-related data for each of the moving pictures, and multi moving picture configuration information for each of the moving pictures, and a user terminal receiving the multi moving picture, the moving picture-related data, and the multi moving picture configuration information and provides a user with a moving picture searching view, which is created by editing the plural moving pictures and the moving picture-related data, according to predetermined searching view generation information and the multi moving picture configuration information.

15 Claims, 9 Drawing Sheets

FIG. 1

| MP 1 | MP 2 | MP 3 | MP 4 |
|------|------|------|------|
| MP 5 | MP 6 | MP 7 | MP 8 |
| MP 9 | MP 10 | MP 11 | MP 12 |
| MP 13 | MP 14 | MP 15 | MP 16 |

MULTI-MOVING PICTURE SEARCHING SERVICE PROVIDING SYSTEM AND METHOD

CROSS-REFERENCE TO RELATED APPLICATION

This application claims priority to Korean patent application 10-2007-57354, filed on Jun. 12, 2007, the disclosure of which is incorporated by reference herein.

BACKGROUND OF THE INVENTION

1. Technical Field

This disclosure is directed to a digital broadcast system, and more specifically to a digital broadcast system providing a user with a moving picture advertising a content.

2. Discussion of Related Art

Recently, digitalized networks and broadcast equipment enable users to receive various contents as well as broadcasts in an interactive manner. Various content providing services include VOD (Moving picture On Demand) services, NVOD (Near Moving picture On Demand) services, Push VOD services, etc.

VOD services allow users to select and watch moving picture contents on demand. NVOD services are a pay-per-view consumer video technique used by multi-channel broadcasts using high bandwidth distribution mechanisms such as satellite and cable television. In NVOD services, multiple copies of a program are broadcast at short time intervals (typically 10-20 minutes) providing convenience for viewers, who can watch the program without needing to tune in at a scheduled point in time. Push VOD services are a technique used by a number of broadcaster on systems that lack the interactivity to provide true moving picture on demand, to stimulate a true moving picture on demand system. In Push VOD services, a push VOD system uses a Personal Video Recorder (PVR) to automatically record a selection of programming, often transmitted in spare capacity overnight. Users can then watch the downloaded programming at times of their choosing. As content occupies space on the PVR hard drive, downloaded content is usually deleted after a week to make way for new programs.

In these content providing services, a content to be provided to users is selected by the users themselves, and therefore, content providers need to provide a diversity of information associated with such content to advertise the content. A conventional method for providing users with information related to content includes providing users with a still image representing the content and a text containing a synopsis of the content; and providing users with a synopsis moving picture for advertising the content through a separate broadcast channel.

In the former method, however, it could be complicated for users to access to the content and it could be insufficient to arouse any interest in the content from users. In the latter method, it could be possible to easily arouse any interest in the content from users because the users may watch the synopsis moving picture of the content, but the users need to wait for desired information to be broadcast so as to obtain such information because of unilateral characteristics of broadcasting. Accordingly, there is a need of multi moving picture searching service providing system and method inducing the use of content from users by providing a user terminal with a multi moving picture that includes plural moving pictures, each related to each of plural contents.

SUMMARY OF THE INVENTION

An exemplary embodiment of the present invention provides a multi picture searching service providing system comprising: a head end transmitting a multi moving picture including plural moving pictures, moving picture-related data for each of the moving pictures, and multi moving picture configuration information for each of the moving pictures; and a user terminal receiving the multi moving picture, the moving picture-related data, and the multi moving picture configuration information and provides a user with a moving picture searching view, which is created by editing the plural moving pictures and the moving picture-related data, according to predetermined searching view generation information and the multi moving picture configuration information.

The moving picture may be a moving picture for advertising a content.

The multi moving picture configuration information may include first size information representing a size of each moving picture on the multi moving picture, and first location information representing a location of each moving picture on the multi moving picture.

The searching view generation information may include second size information representing the extent to which the size of each moving picture is displayed on the moving picture searching view, and second location information representing where each moving picture is to be arranged on the moving picture searching view. The moving picture-related data may include at least one of text data related to each moving picture, still image data related to each moving picture, audio clip data related to each moving picture, and graphic data related to each moving picture.

Said editing may include clipping each moving picture from the multi moving picture according to the first location information and the first size information and arranging the clipped moving picture on the moving picture searching view according to the second location information.

Said editing may include scaling the clipped moving picture according to the second size information.

The moving picture searching view may have a focused moving picture, the focused moving picture is at least one of a moving picture located in the center of the plural moving pictures displayed on the moving picture searching view, a moving picture whose size is the largest among the plural moving pictures displayed on the moving picture searching view, and a moving picture highlighted among the plural moving pictures displayed on the moving picture searching view.

The user terminal may change a moving picture selected by a user's key entry among the plural moving pictures to a focused moving picture.

The head end may include a producing unit receiving plural moving pictures, each of which is associated with each of plural contents, to generate the multi moving picture, a first input unit receiving at least one of text data related to each of the plural moving pictures, still image data related to each of the plural moving pictures, audio clip data related to each of the plural moving pictures, and graphic data related to each of the plural moving pictures to generate the moving picture-related data, and a second input unit receiving size information and location information of each of the plural moving pictures to generate the multi moving picture configuration information.

The multi moving picture configuration information may include first size information representing a size of each moving picture on the multi moving picture, and first location information representing a location of each moving picture on the multi moving picture, and the searching view generation information includes second size information representing the extent to which the size of each moving picture is displayed on the moving picture searching view, second location information representing where each moving picture is to be arranged on the moving picture searching view, and third location information representing where the moving picture-related data is arranged on the moving picture searching view, wherein the moving picture-related data includes at least one of text data related to each of the plural moving pictures, still image data related to each of the plural moving pictures, audio clip data related to each of the plural moving pictures, and graphic data related to each of the plural moving pictures.

The user terminal may include a searching view setup unit generating a first editing request and a second editing request based on the multi moving picture configuration information, the searching view generation information, and the moving picture-related data, a first editing unit editing the multi moving picture to generate an edited image in response to the first editing request, a second editing unit editing the moving picture-related data to generate a graphic image in response to the second editing request, and a overlay unit overlaying the edited image and the graphic image to generate the moving picture searching view.

The first editing request may include the first size information, the first location information, the second size information, and the second location information, wherein the first editing unit clips each moving picture from the multi moving picture according to the first location information and the first size information and arranging the clipped moving picture on the moving picture searching view according to the second location information.

The second editing request may include the third location information, wherein the second editing unit arranges the moving picture-related data on the moving picture searching view according to the third location information.

An exemplary embodiment of the present invention provides a multi moving picture searching service providing method comprising: a) transmitting a multi moving picture, moving picture-related data, and multi moving picture configuration information; b) receiving a user's key entry; and c) receiving the multi moving picture, the moving picture-related data, and the multi moving picture configuration information in response to the key entry and providing the user with a moving picture searching view, which is created by editing the multi moving picture and the moving picture-related data, based on previously stored searching view generation information and the multi moving picture configuration information.

The step a) may include receiving moving pictures, each of which is associated with each of plural contents, to generate the multi moving picture, receiving at least one of text data related to each of the plural moving pictures, still image data related to each of the plural moving pictures, audio clip data related to each of the plural moving pictures, and graphic data related to each of the plural moving pictures to generate the moving picture-related data, receiving size information and location information for each of the moving pictures to generate the multi moving picture configuration information, and assigning a broadcast signal, which is created by multiplexing the multi moving picture, the moving picture-related data, and the multi moving picture configuration information, to a specific channel, and transmitting the broadcast signal through the channel.

The key entry may include a first key entry for selecting the specific channel, wherein the step c) includes receiving the broadcast signal through the specific channel in response to the first key entry and demultiplexing the received broadcast signal into the multi moving picture, the moving picture-related data, and the multi moving picture configuration information, editing the multi moving picture to generate an edited image according to predetermined searching view generation information and the multi moving picture configuration information, editing the moving picture-related data to generate a graphic image according to the searching view generation information, and overlaying the edited image and the graphic image to generate the moving picture searching view.

The moving picture searching view may include a focused moving picture, wherein the focused moving picture is at least one of a moving picture located in the center of the plural moving pictures displayed on the moving picture searching view, a moving picture whose size is the largest among the plural moving pictures displayed on the moving picture searching view, and a moving picture highlighted among the plural moving pictures displayed on the moving picture searching view.

The key entry may include a second key entry for selecting one of the plural moving pictures displayed on the moving picture searching view, wherein the step c) further includes providing the user with a moving picture searching view where the focused moving picture has been changed to another moving picture selected by the second key entry.

BRIEF DESCRIPTION OF THE DRAWINGS

The present invention will become more apparent by describing in detail exemplary embodiments thereof with references to the attached drawings, in which:

FIG. 1 depicts an exemplary multi moving picture used in a multi moving picture searching service providing system according to an exemplary embodiment of the present invention;

DETAILED DESCRIPTIONS OF EXEMPLARY EMBODIMENTS

Figure 2:
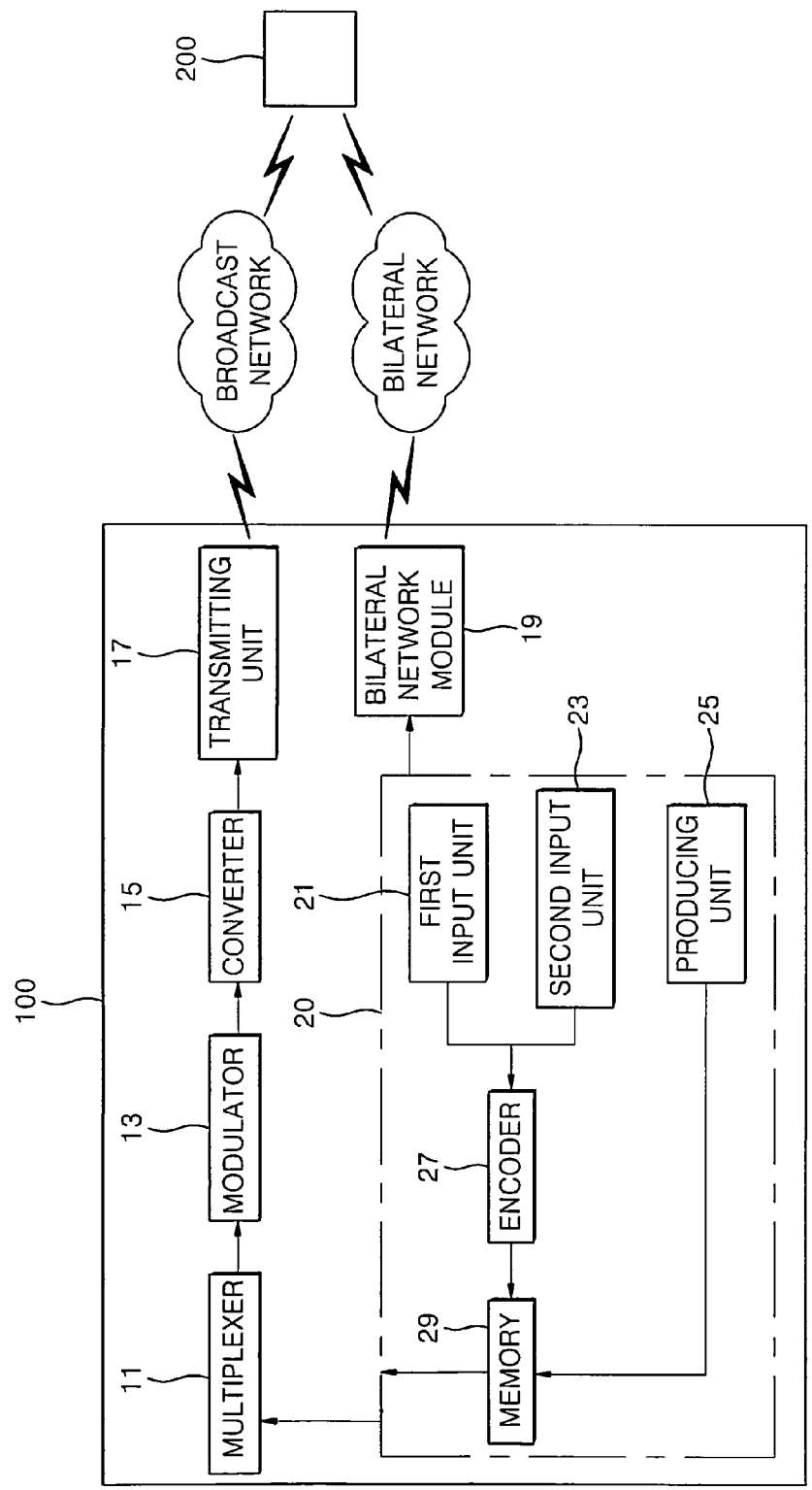
FIG. 2 depicts a construction of a head end included in an exemplary multi moving picture searching service providing system according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 depicts an exemplary multi moving picture used in a multi moving picture searching service providing system according to an exemplary embodiment of the present invention. Referring to FIG. 1, the multi moving picture used in the multi moving picture searching service providing system (hereinafter, referred to as "MMSSPS") includes plural moving pictures MP1 to MP16. Each moving picture MP1 to MP16 may be defined as multi moving picture configuration information in the multi moving picture. Each of moving pictures MP1 to MP16 is associated with each of plural contents, and each moving picture MP1 to MP16 may include a commercial moving picture advertising the contents.

For instance, if the content is a movie, the moving picture may be a synopsis moving picture for advertising the movie. If the content is a commercial moving picture for advertising a product, the moving picture may be an overview moving picture of the commercial moving picture. The number of the moving pictures constituting the multi moving picture may vary with applications. The multi moving picture may be produced at a head end located in a broadcast station and transmitted to a user terminal.

Figure 3:
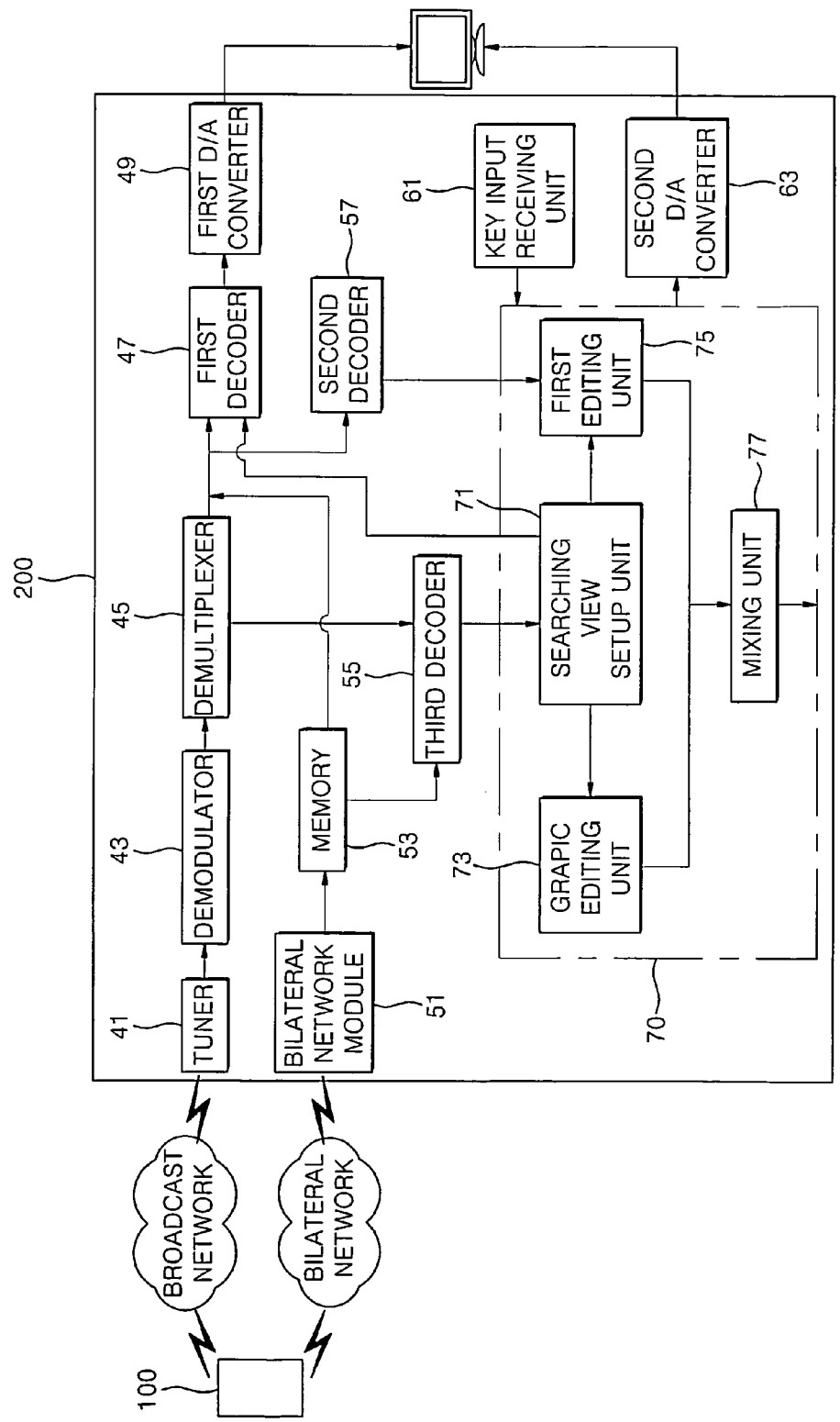
FIG. 3 depicts a construction of a user terminal included in an exemplary multi moving picture searching service providing system according to an exemplary embodiment of the present invention.

The MMSSPS includes a head end 100 and a user terminal 200. FIG. 2 depicts a construction of the head end 100, and FIG. 3 depicts a construction of the user terminal 200.

Referring to FIG. 2, the head end 100 multiplexes a multi moving picture including plural moving pictures, moving picture-related data, and multi moving picture configuration information into a broadcast signal, and transmits the multiplexed broadcast signal to user terminal 200 through a broadcast network. The multi moving picture may be equal to that illustrated in FIG. 1. The moving picture-related data is data associated with the plural moving pictures constituting the multi moving picture. For instance, the moving picture-related data may include moving picture-related text data, moving picture-related still image data, moving picture-related audio clip data, and moving picture-related graphic data. The multi moving picture configuration information includes first size information, first location information, and identification information of each moving picture in the multi moving picture. The plural moving pictures constituting the multi moving picture, moving picture-related data, and multi moving picture configuration information may be provided by a content provider.

More specifically, the head end 100 includes a multi moving picture configuration module 20, a multiplexer 11, a modulator 13, a converter 15, and a transmitting unit 17.

The multi moving picture configuration module 20 includes a producing unit 25, a first input unit 21, a second input unit 23, an encoder 27, and a memory 29. The producing unit 25 receives plural moving pictures, each of which is associated with each of plural contents, from a content provider, produces a multi moving picture from the received moving pictures, and stores the multi moving picture at memory 29. The second input unit 23 generates multi moving picture configuration information from size information, location information, and identification information for each moving picture that are supplied from an external device (not shown), and transmits the generated multi moving picture configuration information to the encoder 27. The second input unit 23 may also use the multi moving picture configuration information previously created as a database in the head end 100 without receiving the size information, the location information, and the identification information from the external device (not shown). The first input unit 21 generates moving picture-related data from text data, still image data, audio clip data, and graphic data that are associated with each moving picture, supplied from an external device (not shown), and transmits the generated moving picture-related data to the encoder 27. The encoder 27 encodes the multi moving picture configuration information transmitted from the second input unit 23 and the moving picture-related data transmitted from the first input unit 21 and stores the resultant data in the memory 29. The memory 29 stores the multi moving picture, and the encoded multi moving picture configuration information and moving picture-related data.

The multiplexer 11 multiplexes the multi moving picture, and the encoded multi moving picture configuration information and moving picture-related data into a broadcast signal, and transmits the multiplexed broadcast signal to the modulator 13. The modulator 13 modulates the broadcast signal to be capable of being transmitted over the broadcast network, and transmits the modulated broadcast signal to the converter 15. The broadcast network includes a terrestrial broadcast network, a cable broadcast network, and a satellite broadcast network. The converter 15 up-converts the modulated broadcast signal to have a desired frequency band, and transmits the up-converted broadcast signal to the transmitting unit 17. A specific channel may be assigned by up-converting of the converter 15, to which the broadcast signal will be transmitted. The transmitting unit 17 transmits the up-converted broadcast signal over the broadcast network. The user terminal 200 may receive the broadcast signal transmitted from the transmitting unit 17 through a specific channel.

Referring to FIG. 3, the user terminal 200 receives the broadcast signal transmitted from the head end 100 through the specific channel and provides a user with a moving picture searching view generated based on searching view generation information. The user terminal 200 may provide the user with a modified moving picture searching view in response to a user's key entry.

The searching view generation information is information necessary for the user terminal 200 to rearrange plural moving pictures constituting the multi moving picture and generate a moving picture searching view. The searching view generation information includes second size information, second location information, and third location information. The second size information represents the extent to which the size of each moving picture is displayed on the moving picture searching view. The second location information represents where each moving picture is to be arranged on the moving picture searching view. The third location information represents where the moving picture-related data is to be arranged on the moving picture searching view. The searching view generation information may be previously stored in the user terminal 200. The searching view generation information previously stored in the user terminal 200 may include plural second size information and plural second location information. The plural second size information and plural second location information may be used to optimize the quality of the moving picture searching view according to the size of TV screen.

The moving picture searching view includes a focused moving picture. The focused moving picture may be one located in the center of the moving picture searching view out of the plural moving pictures, one having the largest size out of the plural moving pictures, or highlighted one out of the plural moving pictures. The focused moving picture may be selected as a default, and this may be changed by a user's key entry.

More specifically, the user terminal 200 includes a tuner 41, a demodulator 43, a demultiplexer 45, a first decoder 47, a first D/A converter 49, a second decoder 57, a third decoder 55, a searching view generation module 70, a key input unit 61, and a second D/A converter 63.

The tuner 41 receives the broadcast signal transmitted over the specific channel and transmits the received broadcast signal to the demodulator 43. The broadcast signal may be the one multiplexed from the multi moving picture, the moving picture-related data, and the multi moving picture configuration information. The demodulator 43 demodulates the received broadcast signal and transmits the demodulated broadcast signal to the demultiplexer 45. The demultiplexer 45 demultiplexes the demodulated broadcast signal into the multi moving picture, the moving picture-related data, and the multi moving picture configuration information. The demultiplexer 45 transmits the demultiplexed multi moving picture to the second decoder 57. The second decoder 57 decodes the demultiplexed multi moving picture and transmits the decoded multi moving picture to the searching view configuration module 70.

The demultiplexer 45 transmits the demultiplexed moving picture-related data and the demultiplexed multi moving picture configuration information to the third decoder 55. The third decoder 55 decodes the demultiplexed moving picture-related data and the demultiplexed multi moving picture configuration information and transmits the decoded moving picture-related data and the decoded multi moving picture configuration information to the searching view generation module 70.

The searching view generation module 70 includes a searching view setup unit 71, a first editing unit 75, a second editing unit 73, and a overlay unit 77. The searching view setup unit 71 generates a first editing request and a second editing request based on the multi moving picture configuration information, the searching view generation information, and the moving picture-related data. The first editing request includes the first size information and the first location information contained in the multi moving picture configuration information, and the second size information and the second location information contained in the searching view generation information. The second editing request includes the moving picture-related data and the third location information contained in the searching view generation information. The searching view setup unit 71 controls the first editing unit 75 based on the first editing request, and the second editing unit 73 based on the second editing request. The first editing unit 75 edits the multi moving picture transmitted from the second decoder 57 in response to the first editing request to generate an edited image, and transmits the edited image to the overlay unit 77. Such editing includes clipping, scaling, and transiting. The clipping clips each moving picture out of the multi moving picture according to the first location information and the first size information. The scaling adjusts the size of the clipped moving picture according to the second size information. The transiting arranges the clipped moving picture on the moving picture searching view according to the second location information. The second editing unit 73 arranges the moving picture-related data contained in the second editing request on the moving picture searching view according to the third location information to generate a graphic image, and transmits the generated graphic image to the overlay unit 77. The overlay unit 77 generates a moving picture searching view overlayed from the edited image and graphic image and transmits the moving picture searching view to the second D/A converter 63. The second D/A converter 63 performs digital-to-analog conversion on the moving picture searching view and transmits the analog moving picture searching view to a TV. The TV provides the analog moving picture searching view to the user. The moving picture searching view includes the focused moving picture that has been selected as default.

The key input unit 61 receives a user's key entry for moving picture searching, and transmits the resultant signal to the searching view generation module 70. A particular one to be newly focused among the moving pictures is selected by the user's key entry for moving picture searching. Such a key entry may be performed by a remote controller (not shown) or a function key set mounted on the user terminal 200. The searching view generation module 70 generates a focus changing request according to the user's key entry for changing focused moving picture, and controls the first editing unit 75 and the second editing unit 73. The first editing unit 75 generates an edited image by focusing the moving picture selected by a user's key entry in response to the focus changing request. The second editing unit 73 generates a graphic image containing moving picture-related data of the moving picture selected by a user's key entry in response to the focus changing request. The overlay unit 77 overlays the edited image with the graphic image, and the second D/A converter 63 performs digital-to-analog conversion on the overlayed edited image and graphic image to generate a moving picture searching view whose focused moving picture has been changed. Then, the second D/A converter 63 provides the moving picture searching view to the TV so that the user can watch it.

The broadcast signal transmitted from the head end 100 may further include an audio associated with each moving picture. The demultiplexer 45 demultiplexes the broadcast signal transmitted from the head end 100 via the tuner 41 and the demodulator 43 to extract audio from the broadcast signal, and transmits the extracted audio to the first decoder 47. The searching view setup unit 71 generates an audio selection request using the identification information of the multi moving picture configuration information and controls the first decoder 47 based on the audio selection request. The identification information may correspond to the focused moving picture on the moving picture searching view. The first decoder 47 decodes the audio selected according to the audio selection request and transmits the decoded audio to the first D/A converter 49. The first D/A converter 49 performs digital-to-analog conversion on the decoded audio and transmits the analog audio to the TV. The TV outputs the analog audio as voice.

Although a case has been described in the exemplary embodiment of the present invention, where the broadcast signal, which is created by multiplexing the multi moving picture, the moving picture-related data, and the multi moving picture configuration information, is transmitted from the head end 100 to the user terminal 200 over the broadcast network, the method of transmitting the multi moving picture, the moving picture-related data, and the multi moving picture configuration information from the head end 100 to the user terminal 200 is not limited thereto. For instance, the head end 100 and the user terminal 200 may further include a bilateral network module 17 and a bilateral network module 51, respectively, which are connected to a bilateral network. The head end 100 may transmit the multi moving picture, the moving picture-related data, and the multi moving picture configuration information to the user terminal 200 through the bilateral network modules 17 and 51. The bilateral network may be a communication network that includes the Internet. The user terminal 200 may include a memory 53 that stores the multi moving picture, the moving picture-related data, and the multi moving picture configuration information transmitted from the head end 100 through the bilateral network modules 17 and 51. The multi moving picture stored in the memory 53 is transmitted to the second decoder 57. The moving picture-related data and the multi moving picture configuration information stored in the memory 53 are transmitted to the third decoder 55. Operations of the other components could be easily understood by those skilled in the art from the descriptions associated with transmitting the broadcast signal, which is created by multiplexing the multi moving picture, the moving picture-related data, and the multi moving picture configuration information, from the head end 100 to the user terminal 200 over the broadcast network, and therefore, their detailed descriptions will be omitted.

Figure 4:
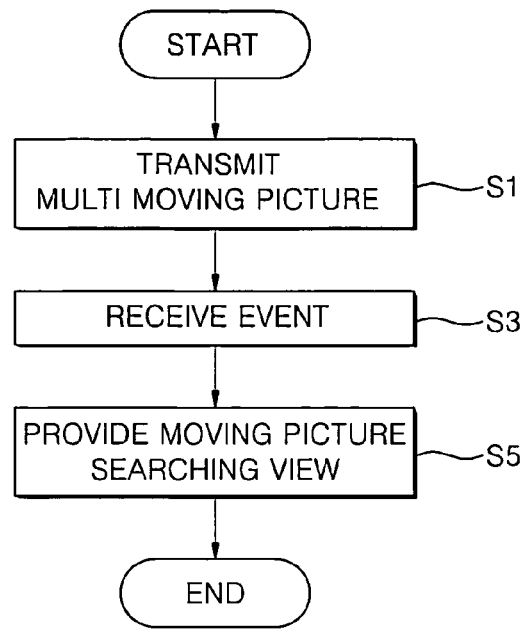
FIG. 4 depicts a multi moving picture searching service providing method according to an exemplary embodiment of the present invention.

FIG. 4 depicts a multi moving picture searching service providing method according to an exemplary embodiment of the present invention. Referring to FIG. 4, the multi moving picture searching service providing method includes a multi moving picture transmitting step S1, an event receiving step S3, and a moving picture searching view providing step S5.

In the multi moving picture transmitting step S1, the head end assigns the broadcast signal, which is created by multiplexing the multi moving picture, the moving picture-related data, and the multi moving picture configuration information, to a specific channel, and transmits the broadcast signal over the broadcast network. More specifically, the head end generates the multi moving picture using moving pictures, each of which is associated with each of plural contents. The head end generates multi moving picture configuration information using the size information, the location information, and the identification information for each moving picture. The head end generates moving picture-related data using text data, still image data, audio clip data, and graphic data that are associated with each moving picture. The head end encodes the multi moving picture configuration information and the moving picture-related data, and then multiplexes, modulates, and up-converts the multi moving picture, the encoded multi moving picture configuration information, and the encoded moving picture-related data to generate the broadcast signal. And then, the head end transmits the broadcast signal to the user terminal over the broadcast network. The up-converting assigns a certain channel to the broadcast signal that includes the multi moving picture.

In the event receiving step S3, the user terminal receives a user's key entry. The user's key entry includes a first key entry and a second key entry. The first key entry is performed to select a specific channel, and this may include pressing a predetermined "hot key". The second key entry is performed to select one of plural moving pictures on the moving picture searching view. For example, the second key entry may be the entry of UP key or DOWN key. The moving picture selected by the second key entry may be focused to be a focused moving picture.

In the moving picture searching view providing step S5, the user terminal provides the moving picture searching view to the user in response to the first key entry and the focus-changed moving picture searching view to the user in response to the second key entry.

More specifically, Upon the first key entry, the user terminal receives, demodulates, demultiplexes, and decodes the broadcast signal transmitted through the specific channel to recover the multi moving picture, the moving picture-related data, and the multi moving picture configuration information prior to the transmission from the head end to the user terminal. The user terminal clips the plural moving pictures constituting the multi moving picture using the multi moving picture configuration information. The user terminal rearranges the clipped moving pictures to generate the moving picture searching view using the searching view generation information previously stored in the user terminal, and provides the generated moving picture searching view to the user. The user terminal may represent the one selected as default among the moving pictures included in the moving picture searching view as the focused moving picture. The user terminal may represent the focused moving picture differently from the other moving pictures, for example by positioning the focused moving picture at the center of the moving picture searching view, increasing the size of the focused moving picture, or highlighting the focused moving picture. The user terminal may overlay the moving picture searching view with the moving picture-related data corresponding to the focused moving picture and provide the overlayed result to the user.

Upon the second key entry, the user terminal focuses the moving picture selected by the second key entry to change the focused moving picture to another one, generates the moving picture searching view including the changed focused moving picture, and provides the generated moving picture searching view to the user. The user may receive the content corresponding to the focused moving picture through the bilateral network or entry of a particular key in a remote controller.

In the multi moving picture transmitting step S1, the head end assigns the broadcast signal, which is created by multiplexing the multi moving picture, the moving picture-related data, the multi moving picture configuration information, and audios, to a specific channel, and transmits the broadcast signal over the broadcast network. Each audio corresponds to each of the moving pictures constituting the multi moving picture. In the moving picture searching view providing step S5, the head end may convert the audio corresponding to the focused moving picture on the moving picture searching view into voice using the identification information and provide the speech to the user along with the moving picture searching view.

Figure 5:
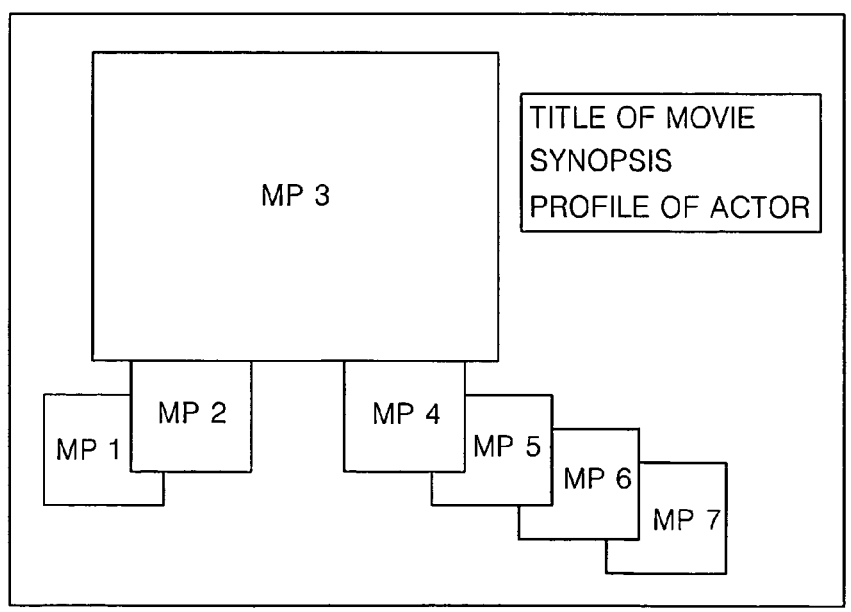
FIG. 5 depicts an exemplary moving picture searching view provided to a user according to an exemplary embodiment of the present invention.

FIG. 5 depicts an exemplary moving picture searching view provided to a user according to an exemplary embodiment of the present invention. Referring to FIG. 5, the moving picture searching view includes plural moving pictures MP1 to MP7. Each of the moving pictures MP1 to MP7 may be a synopsis moving picture for advertising a movie. The moving pictures MP1 to MP7 are the ones rearranged using the multi moving picture configuration information and the searching view generation information among the moving pictures included in the multi moving picture as described above with reference to FIGS. 1 to 4.

The moving picture MP3 whose size is the largest among the moving pictures is the focused moving picture. The information appearing at the left side of the focused moving picture is the moving picture-related data for the focused moving picture. If the focused moving picture is a synopsis moving picture for advertising a movie, the moving picture-related data may contain title of the movie, synopsis, and profile of the actor.

The user may change the focused moving picture to another one by pressing a left shift key or right shift key of a remote controller. For instance, if the user presses the right shift key of the remote controller twice, the user terminal shifts the moving pictures on the moving picture searching view and simultaneously enlarges the size of the moving picture MP5 that is located the second from the moving picture MP3 so that the moving picture MP5 may be represented as new focused moving picture. The user terminal may provide the user with the moving picture searching view that includes the moving picture-related data corresponding to the newly changed focused moving picture MP5.

As described above, the multi moving picture searching service providing system may enhance advertising effect compared with conventional methods, which provide a moving picture for advertising content to users through a separate channel, or provide only the simple text information for content to the users, because of being capable of promoting user's content usage by providing the user terminal with a multi moving picture that includes plural moving pictures each of which is associated with each of plural contents.

Figure 6:
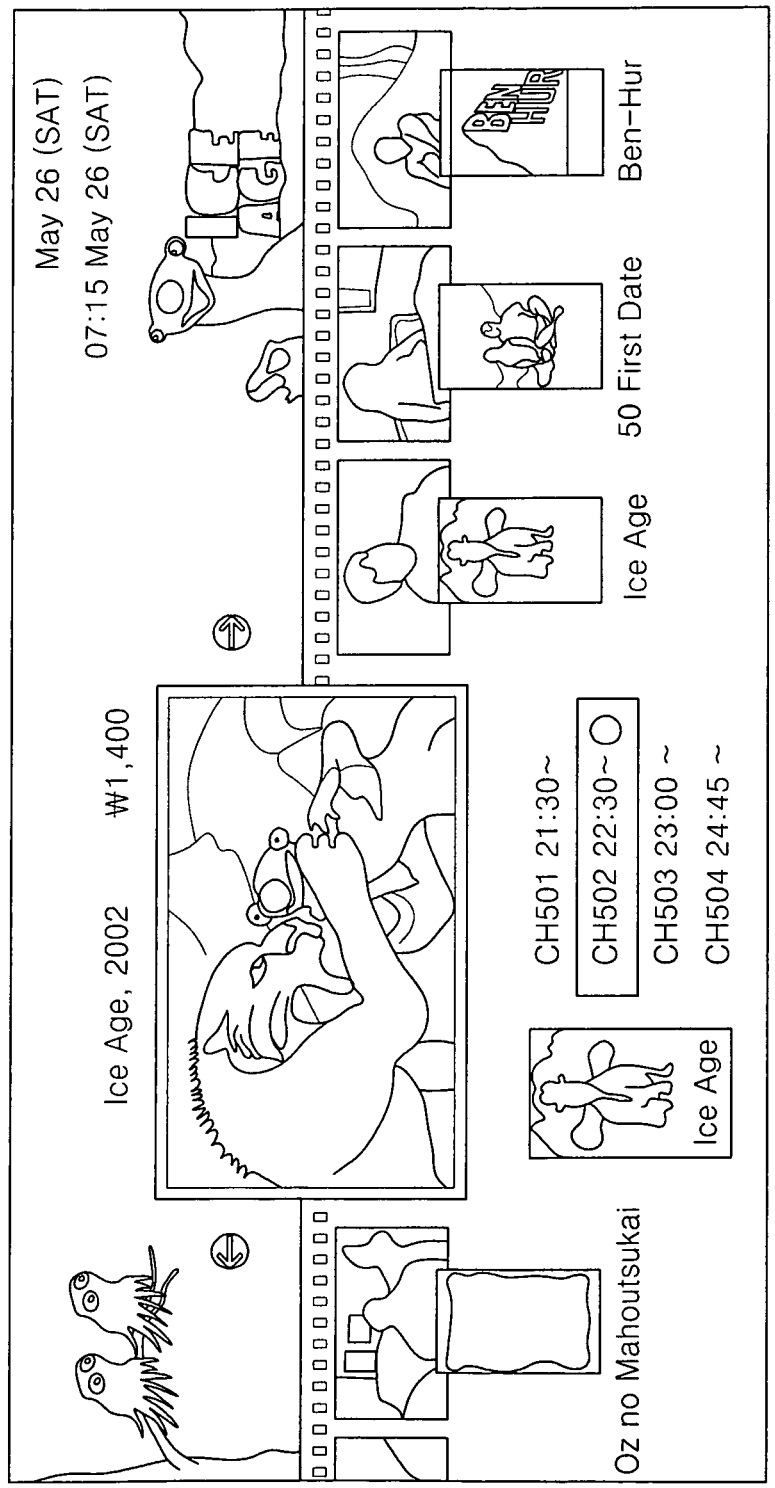
FIGS. 6 and 7 depict an exemplary user interface for providing the moving picture searching view shown in FIG. 5.
Figure 7:
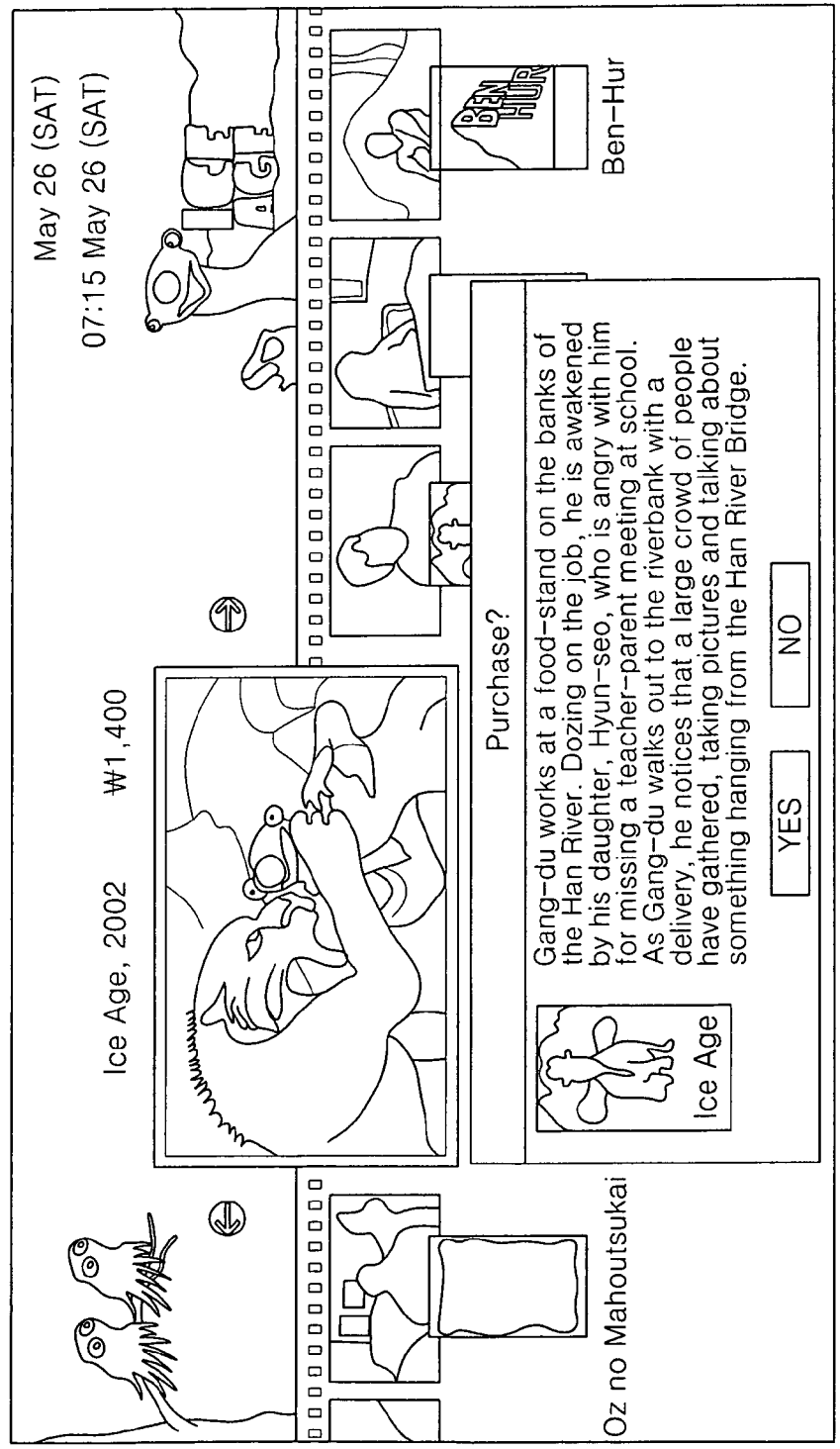

FIGS. 6 and 7 depict an exemplary user interface for providing the moving picture searching view shown in FIG. 5. Referring to FIG. 6, the moving picture searching view contains moving pictures for advertising a movie, one of which is focused. Referring to FIG. 7, the user terminal may provide the user with a user interface for paying for the movie while additionally providing the user with the moving picture-related data associated with the focused moving picture when the user presses a specific key of a remote controller.

Figure 8:
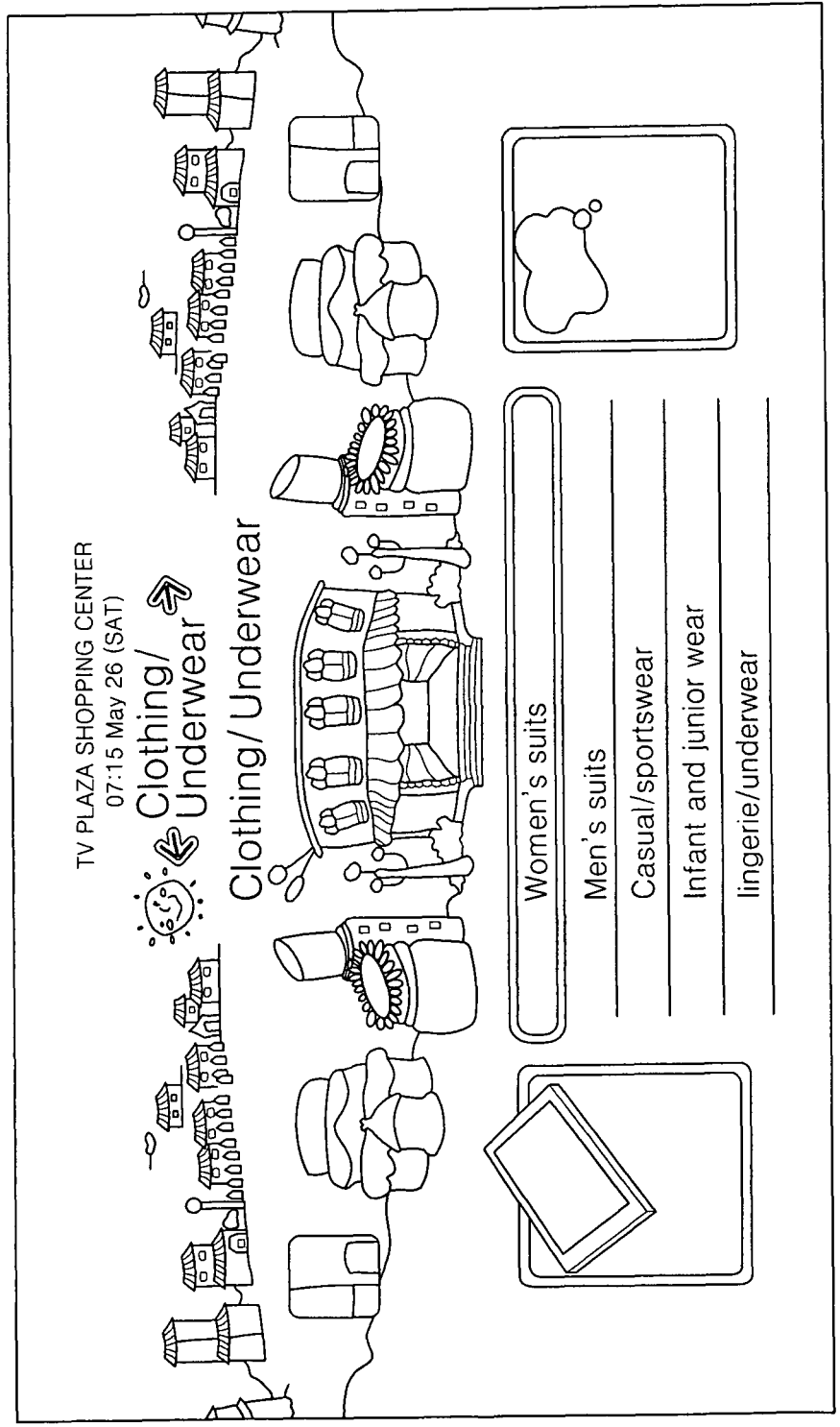
FIGS. 8 to 10 depict another exemplary user interface for providing the moving picture searching view shown in FIG. 5.
Figure 9:
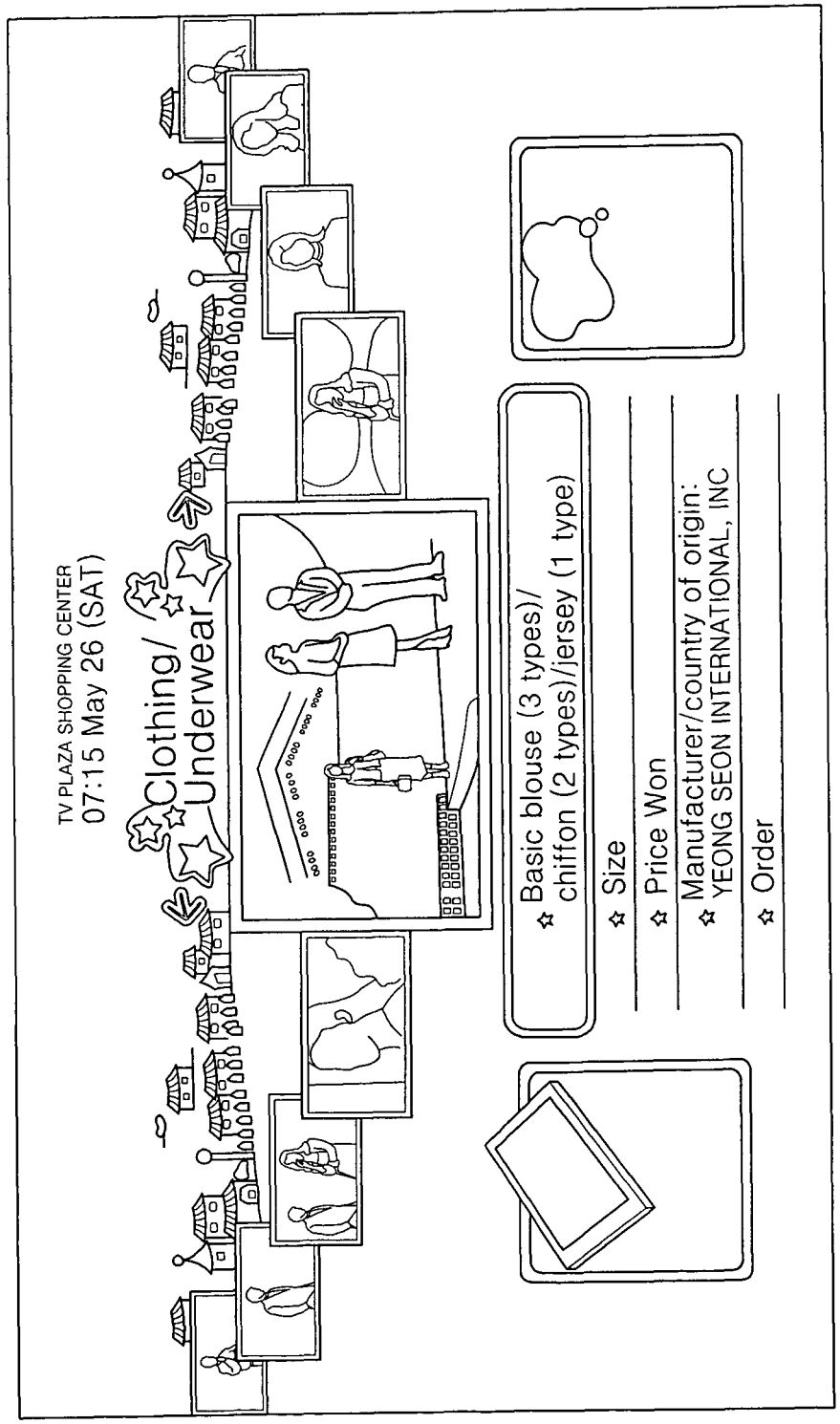
Figure 10:
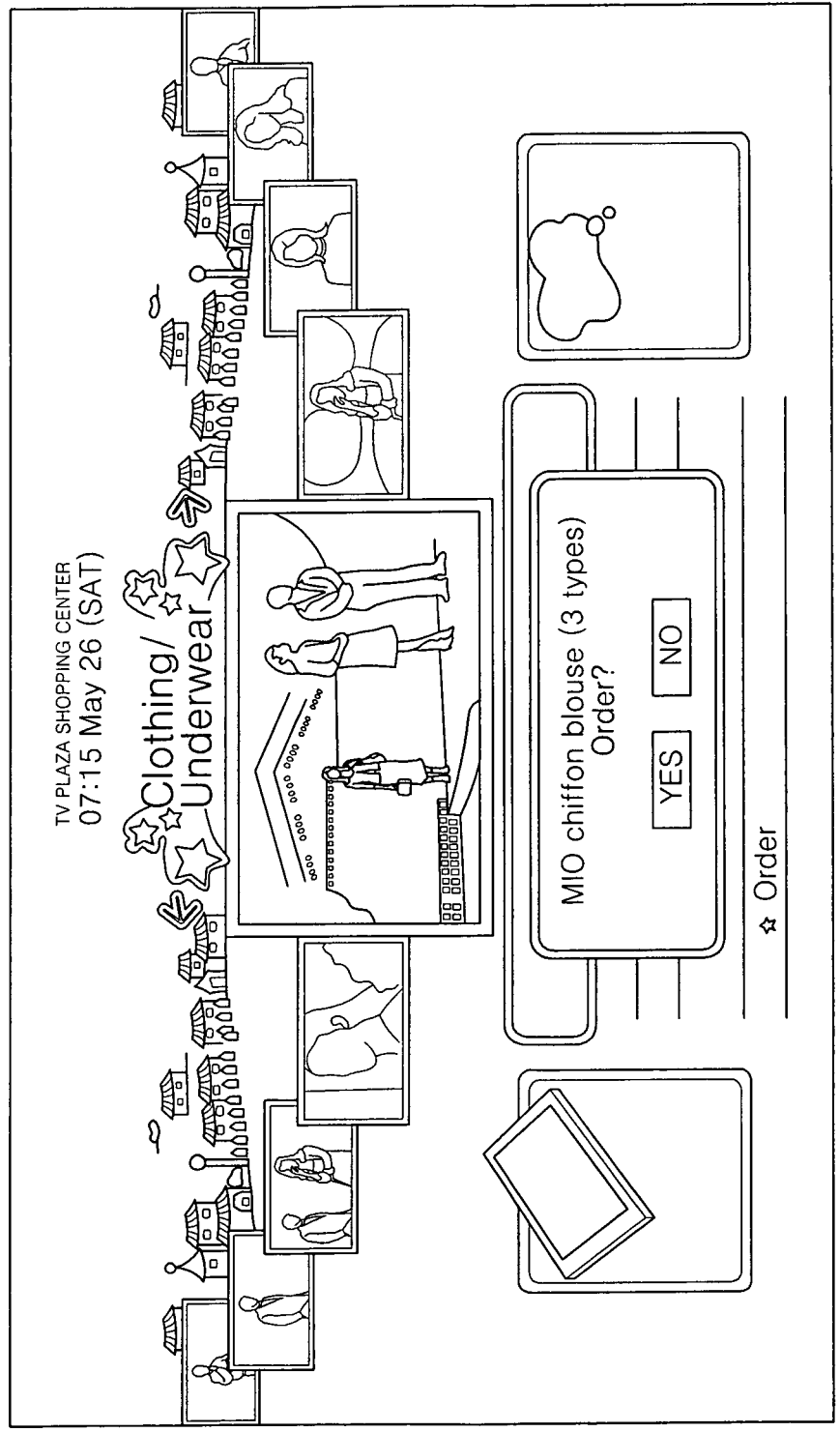

FIGS. 8 to 10 depict another exemplary user interface for providing the moving picture searching view shown in FIG. 5. A user interface is shown in FIG. 8, which may be provided to the user for home shopping. The user interface for home shopping shows the user various types of products, for example, such as suits, casual wear, etc. to permit the user to select one. Referring to FIG. 9, a moving picture searching view related to women's suits is provided to the user by the user terminal in case that the user selects women's suits through the user interface for home shopping. The moving picture searching view contains moving pictures for advertising women's suits, one of which is focused. The moving picture searching view further includes the moving picture-related data, for example, size, price, and manufacturer, associated with the focused moving picture. Referring to FIG. 10, the user terminal may provide the user with a user interface for buying the women's suits related to the focused moving picture when the user presses a specific key of the remote controller to buy a dress associated with the focused moving picture.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A multi picture searching service providing system comprising:
   a head end adapted to produce and transmit a multi moving picture including a plurality of moving pictures, moving picture-related data for each of the moving pictures, and multi moving picture configuration information for each of the moving pictures, wherein the multi moving picture configuration information includes first size information representing a size of each moving picture on the multi moving picture, and first location information representing a location of each moving picture on the multi moving picture; and
   a user terminal adapted to receive the multi moving picture, the moving picture-related data, and the multi moving picture configuration information and adapted to provide a user with a moving picture searching view, which is created by editing the plurality of moving pictures and the moving picture-related data, according to predetermined searching view generation information and the multi moving picture configuration information, wherein the searching view generation information includes second size information representing the extent to which the size of each moving picture is displayed on the moving picture searching view, and second location information representing where each moving picture is to be arranged on the moving picture searching view,
   wherein the moving picture searching view displays a focused moving picture differently from the other moving pictures but included in the moving picture searching view sequentially as a part of an arrangement of multiple moving pictures, the focused moving picture displayed in the center of and part of the arrangement of the plurality of moving pictures displayed on the moving picture searching view and whose size is the largest among the plurality of moving pictures displayed on the moving picture searching view,
   wherein the first editing request may include the first size information, the first location information, the second size information, and the second location information, wherein the first editing unit clips each moving picture from the multi moving picture according to the first location information and the first size information and arranging the clipped moving picture on the moving picture searching view according to the second location information; and the second editing request may include the third location information, wherein the second editing unit arranges the moving picture-related data on the moving picture searching view according to the third location information,
   wherein the moving picture is a moving picture for advertising a content, each of the moving pictures is a synopsis moving picture for advertising a movie or each of the moving pictures is a commercial moving picture for advertising a product,
   and wherein if the each of the moving pictures is the synopsis moving picture, the moving picture-related data comprises the title of the movie and a synopsis, and if the each of the moving pictures is the commercial moving picture, the moving picture-related data comprises at least one of the size, -price, and manufacturer of the product.

2. The multi picture searching service providing system of claim 1, wherein the moving picture-related data includes at least one of text data related to each moving picture, still image data related to each moving picture, audio clip data related to each moving picture, and graphic data related to each moving picture.

3. The multi picture searching service providing system of claim 1, wherein said editing includes scaling the clipped moving picture according to the second size information.

4. The multi picture searching service providing system of claim 1, wherein the user terminal changes a moving picture selected by a user's key entry among the plurality of moving pictures to a focused moving picture.

5. The multi picture searching service providing system of claim 1, wherein the head end includes
   a producing unit adapted to receive a plurality of moving pictures, each of which is associated with each of a plurality of contents, to generate the multi moving picture,
   a first input unit adapted to receive at least one of text data related to each of the plurality of moving pictures, still image data related to each of the plurality of moving pictures,
   audio clip data related to each of the plurality of moving pictures, and graphic data related to each of the plurality of moving pictures to generate the moving picture-related data, and a second input unit receiving size information and location information of each of the plurality of moving pictures to generate the multi moving picture configuration information.

6. The multi picture searching service providing system of claim 1, wherein the multi moving picture configuration information includes first size information representing a size of each moving picture on the multi moving picture, and first location information representing a location of each moving picture on the multi moving picture, and the searching view generation information includes second size information representing the extent to which the size of each moving picture is displayed on the moving picture searching view, second location information representing where each moving picture is to be arranged on the moving picture searching view, and third location information representing where the moving picture-related data is arranged on the moving picture searching view, wherein the moving picture-related data includes at least one of text data related to each of the plurality of moving pictures, still image data related to each of the plurality of moving pictures, audio clip data related to each of the plurality of moving pictures, and graphic data related to each of the plurality of moving pictures.

7. The multi picture searching service providing system of claim 6, wherein the user terminal includes
a searching view setup unit generating a first editing request and a second editing request based on the multi moving picture configuration information, the searching view generation information, and the moving picture-related data,
a first editing unit editing the multi moving picture to generate an edited image in response to the first editing request,
a second editing unit editing the moving picture-related data to generate a graphic image in response to the second editing request, and
a overlay unit overlaying the edited image and the graphic image to generate the moving picture searching view.

8. The multi picture searching service providing system of claim 7, wherein the first editing request includes the first size information, the first location information, the second size information, and the second location information, wherein the first editing unit clips each moving picture from the multi moving picture according to the first location information and the first size information and arranging the clipped moving picture on the moving picture searching view according to the second location information.

9. The multi picture searching service providing system of claim 7, wherein the second editing request includes the third location information, wherein the second editing unit arranges the moving picture-related data on the moving picture searching view according to the third location information.

10. A multi moving picture searching service providing method comprising:
generating a multi moving picture including a plurality of moving pictures, moving picture-related data and multi moving picture configuration information, wherein the multi moving picture configuration information includes first size information representing a size of each moving picture on the multi moving picture, and first location information representing a location of each moving picture on the multi moving picture;
transmitting the multi moving picture, moving picture-related data, and multi moving picture configuration information;
receiving a user's key entry; and
receiving the multi moving picture, the moving picture-related data, and the multi moving picture configuration information in response to the key entry and providing the user with a moving picture searching view, created by editing the multi moving picture and the moving picture-related data, based on previously stored searching view generation information and the multi moving picture configuration information, wherein the searching view generation information includes second size information representing the extent to which the size of each moving picture is displayed on the moving picture searching view, and second location information representing where each moving picture is to be arranged on the moving picture searching view,
wherein the moving picture searching view displays a focused moving picture differently from the other moving pictures but included in the moving picture searching view sequentially as a part of an arrangement of multiple moving pictures, the focused moving picture displayed in the center of and part of the arrangement of the plurality of moving pictures displayed on the moving picture searching view and whose size is the largest among the plurality of moving pictures displayed on the moving picture searching view,
wherein the moving picture is a moving picture for advertising a content, each of the moving pictures is a synopsis moving picture for advertising a movie or each of the moving pictures is a commercial moving picture for advertising a product,
and wherein if the each of the moving pictures is the synopsis moving picture, the moving picture-related data comprises the title of the movie and a synopsis, and if the each of the moving pictures is the commercial moving picture, the moving picture-related data comprises at least one of the size, price, and manufacturer of the product.

11. The multi picture searching service providing method of claim 10, wherein the transmitting a multi moving picture, moving picture-related data, and multi moving picture configuration information includes
receiving moving pictures, each of which is associated with each of a plurality of contents, to generate the multi moving picture,
receiving at least one of text data related to each of the plurality of moving pictures, still image data related to each of the plurality of moving pictures, audio clip data related to each of the plurality of moving pictures, and graphic data related to each of the plurality of moving pictures to generate the moving picture-related data,
receiving size information and location information for each of the moving pictures to generate the multi moving picture configuration information, and
assigning a broadcast signal, which is created by multiplexing the multi moving picture, the moving picture-related data, and the multi moving picture configuration information, to a specific channel, and transmitting the broadcast signal through the channel.

12. The multi picture searching service providing method of claim 11, wherein the key entry includes a first key entry for selecting the specific channel, wherein the receiving the multi moving picture, the moving picture-related data, and the multi moving picture configuration information and providing the user with a moving picture searching view includes
receiving the broadcast signal through the specific channel in response to the first key entry and demultiplexing the received broadcast signal into the multi moving picture, the moving picture-related data, and the multi moving picture configuration information,
editing the multi moving picture to generate an edited image according to predetermined searching view generation information and the multi moving picture configuration information,
editing the moving picture-related data to generate a graphic image according to the searching view generation information, and
overlaying the edited image and the graphic image to generate the moving picture searching view.

13. The multi picture searching service providing method of claim 12, wherein the key entry includes a second key entry for selecting one of the plurality of moving pictures displayed on the moving picture searching view, wherein the providing the user with a moving picture searching view further includes providing the user with a moving picture searching view where the focused moving picture has been changed to another moving picture selected by the second key entry.

14. A multi picture searching service providing system comprising:
a head end adapted to produce and transmit a multi moving picture including a plurality of moving pictures, moving picture-related data for each of the moving pictures, and multi moving picture configuration information for each of the moving pictures, wherein the multi moving picture configuration information includes first size information representing a size of each moving picture on the multi moving picture, and first location information representing a location of each moving picture on the multi moving picture; and
a user terminal adapted to receive the multi moving picture, the moving picture-related data, and the multi moving picture configuration information and adapted to provide a user with a moving picture searching view, which is created by editing the plurality of moving pictures and the moving picture-related data, according to predetermined searching view generation information and the multi moving picture configuration information, wherein the searching view generation information includes second size information representing the extent to which the size of each moving picture is displayed on the moving picture searching view, and second location information representing where each moving picture is to be arranged on the moving picture searching view,
wherein the moving picture searching view displays a focused moving picture differently from the other moving pictures but included in the moving picture searching view sequentially as a part of an arrangement of multiple moving pictures, the focused moving picture displayed in the center of and part of the arrangement of the plurality of moving pictures displayed on the moving picture searching view and whose size is the largest among the plurality of moving pictures displayed on the moving picture searching view,
wherein the first editing request may include the first size information, the first location information, the second size information, and the second location information, wherein the first editing unit clips each moving picture from the multi moving picture according to the first location information and the first size information and arranging the clipped moving picture on the moving picture searching view according to the second location information; and the second editing request may include the third location information, wherein the second editing unit arranges the moving picture-related data on the moving picture searching view according to the third location information,
wherein each of the moving pictures is a synopsis moving picture for advertising a movie or each of the moving pictures is a commercial moving picture for advertising a product,
and wherein if the each of the moving pictures is the synopsis moving picture, the moving picture-related data comprises the title of the movie and a synopsis, and if the each of the moving pictures is the commercial moving picture, the moving picture-related data comprises at least one of the size, price, and manufacturer of the product.

15. A multi moving picture searching service providing method comprising:
generating a multi moving picture including a plurality of moving pictures, moving picture-related data and multi moving picture configuration information, wherein the multi moving picture configuration information includes first size information representing a size of each moving picture on the multi moving picture, and first location information representing a location of each moving picture on the multi moving picture;
transmitting the multi moving picture, moving picture-related data, and multi moving picture configuration information;
receiving a user's key entry; and
receiving the multi moving picture, the moving picture-related data, and the multi moving picture configuration information in response to the key entry and providing the user with a moving picture searching view, created by editing the multi moving picture and the moving picture-related data, based on previously stored searching view generation information and the multi moving picture configuration information, wherein the searching view generation information includes second size information representing the extent to which the size of each moving picture is displayed on the moving picture searching view, and second location information representing where each moving picture is to be arranged on the moving picture searching view, wherein the moving picture searching view displays a focused moving picture differently from the other moving pictures but included in the moving picture searching view sequentially as a part of an arrangement of multiple moving pictures, the focused moving picture displayed in the center of and part of the arrangement of the plurality of moving pictures displayed on the moving picture searching view and whose size is the largest among the plurality of moving pictures displayed on the moving picture searching view,
wherein the moving picture is a moving picture for advertising a content, each of the moving pictures is a synopsis moving picture for advertising a movie or each of the moving pictures is a commercial moving picture for advertising a product, and
wherein if the each of the moving pictures is the synopsis moving picture, the moving picture-related data comprises the title of the movie and a synopsis, and if the each of the moving pictures is the commercial moving picture, the moving picture-related data comprises at least one of the size, -price, and manufacturer of the product.

\* \* \* \* \*